INVENTOR.
Louis Bucalo
BY John C. McGregor

Aug. 21, 1962 L. BUCALO 3,050,266
APPARATUS FOR WINDING WIRE ON FORMS
Filed May 20, 1957 7 Sheets-Sheet 4

INVENTOR
Louis Bucalo
BY
John C. McGregor

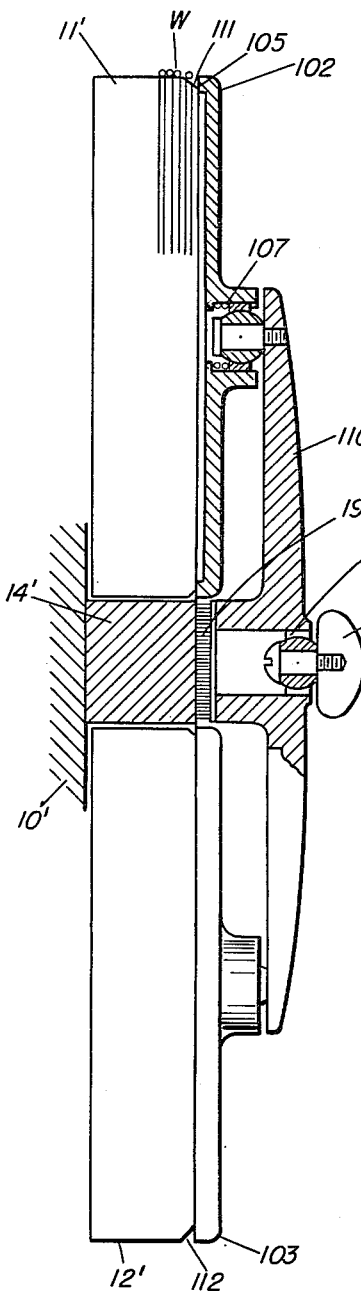
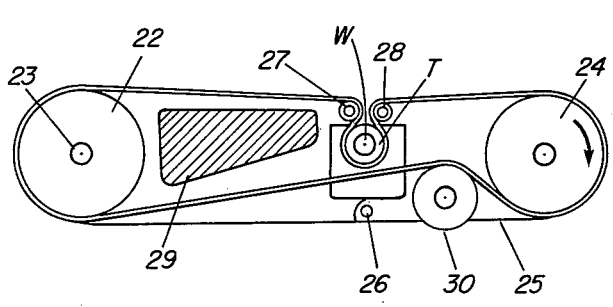
FIG.7
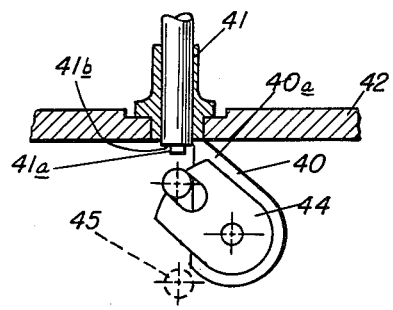
FIG.8
FIG.6
INVENTOR.
Louis Bucalo

United States Patent Office 3,050,266
Patented Aug. 21, 1962

3,050,266
APPARATUS FOR WINDING WIRE ON FORMS
Louis Bucalo, Holbrook, N.Y., assignor to Specialties, Inc., Syosset, N.Y., a corporation of New York
Filed May 20, 1957, Ser. No. 660,282
9 Claims. (Cl. 242—4)

This invention relates to methods and apparatus for winding coils of wire on cores or forms, particularly closed forms such as toroids, without the use of a shuttle.

Conventional techniques for putting coils of wire on forms such as toroids include, in addition to simple manual operations, various shuttle techniques in which a shuttle carrying a supply of wire is passed back and forth through the center. Among other disadvantages, shuttle winding is necessarily limited as to the number of turns that can be wound on any given closed form because space must be left in the center for the shuttle to pass. Also, the severe flexing to which the wire is subjected tends to make shuttle techniques impractical when heavy gage or stiff wire is used. Another technique suggested in the past is that of spinning off a large loop structure passing through the form into a cluster of much smaller loops drawn up on the form. Heretofore, there has been no known apparatus or method for adequately implementing this technique, which remains therefore essentially a hand operation.

The apparatus and methods of the present invention overcome these and other shortcomings of prior techniques by providing for the winding of forms not only at rapid rates, but to a point at which the center opening size can approach values as small as twice the diameter of the winding wire itself. Moreover, the present invention facilitates the winding of toroidal forms with wire of relatively heavy gage by minimizing the flexing operations imposed thereon.

In accordance with a preferred embodiment of the invention, the basic form is supported adjacent drum means such, for example, as along a tangent line between a pair of laterally spaced drums. The wire to be wound on the form or core is first set up in a loop system of relatively few turns of large size, with one limb of each complete loop passing through the center of the form. Each loop contains sufficient wire to form a number of turns on the wound unit. The leading end of the wire of the loop system can be secured to the adjacent limb of the next loop and the trailing end to a fixed point. By rotating the drums before the trailing end is secured but after the leading end is secured to the next adjacent limb, any desired number of loops can be pulled onto the drums. If preferred, the large loops can be put on the drum means by attaching the lead end of the wire to a detachable guide belt passing about the drums and pulling on the desired number of loops by rotating the drums.

After the loop system has been established and the ends secured, the drums are driven to draw taut the limb of wire leading to the fixed point. At this time the loop containing that limb is released from the drums to provide slack which, when taken up again by the rotating drums, thereby reconstituting the loop system, less a small length of wire, appears as a turn on the form. During this slack period, however, the loop system must be preserved, this being accomplished by friction or holding means preserving tension throughout the loop structure. As each successive turn is pulled tight around the form, the outer loop is released from the drums to be drawn around the form as a turn, with the excess wire being reincorporated in the major loop structure. The process continues at high speed until the desired number of turns are wound on the form, with the loops on the drums gradually unwinding until either the form is fully wound or the wire in the loop system is exhausted.

If it is desired to wind the form with turns to achieve a given electrical parameter reflecting, say, the inductance of the unit, a test signal can be applied between the fixed end of the wire and the wire in the loop system, preferably adjacent one of the drums over which the wire is initially looped. By baring the wire of insulation to form a contact point, which can for convenience be the connection between the leading, free end of the wire and a limb of the adjacent loop, a measurement can be made each time the barred or central portion passes the measuring point. Taps in any desired number can be provided for each wound coil by selectively interposing a holding member in the path of contraction of one or more of the loops as they are released from the drums so that the selected loops are pulled up short of the form to leave loop leads extending out from the otherwise compact coil on the form.

A representative embodiment of the invention from which the above and other features will be understood is described below having reference to the accompanying drawings, in which:

FIGURE 6 is a side view partly in elevation and partly in section of a modified cover plate construction;

FIGURE 7 is a top view partly in horizontal section showing details of the portion of the apparatus for supporting the toroidal form to be wound;

FIGURE 8 is a fragmentary view, partly in vertical section and partly in elevation, taken on the line 8—8 of FIGURE 2;

Figure 1:
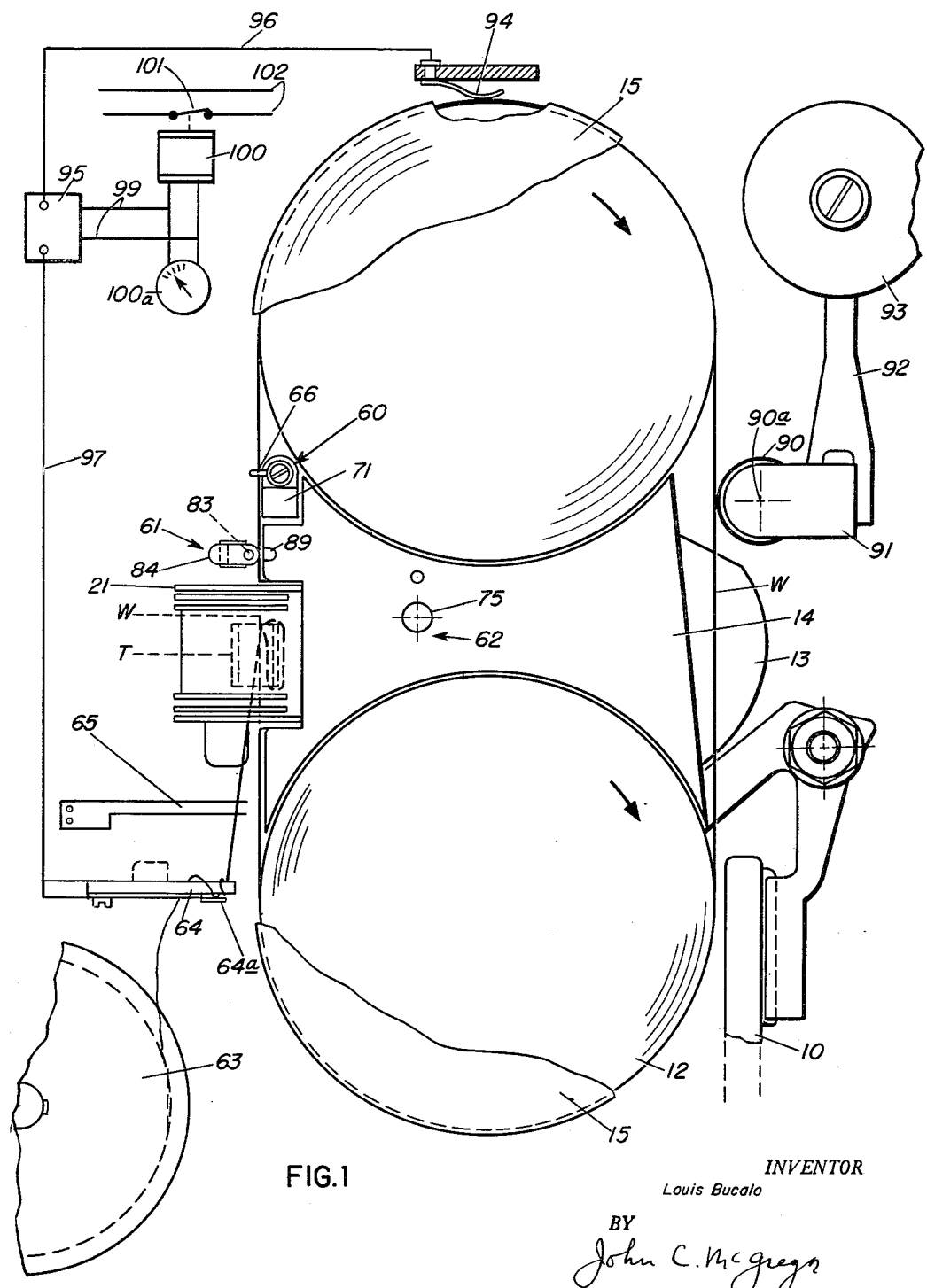
FIGURE 1 is a view in front elevation of a toroidal winding apparatus with the front cover plate removed.
Figure 2:
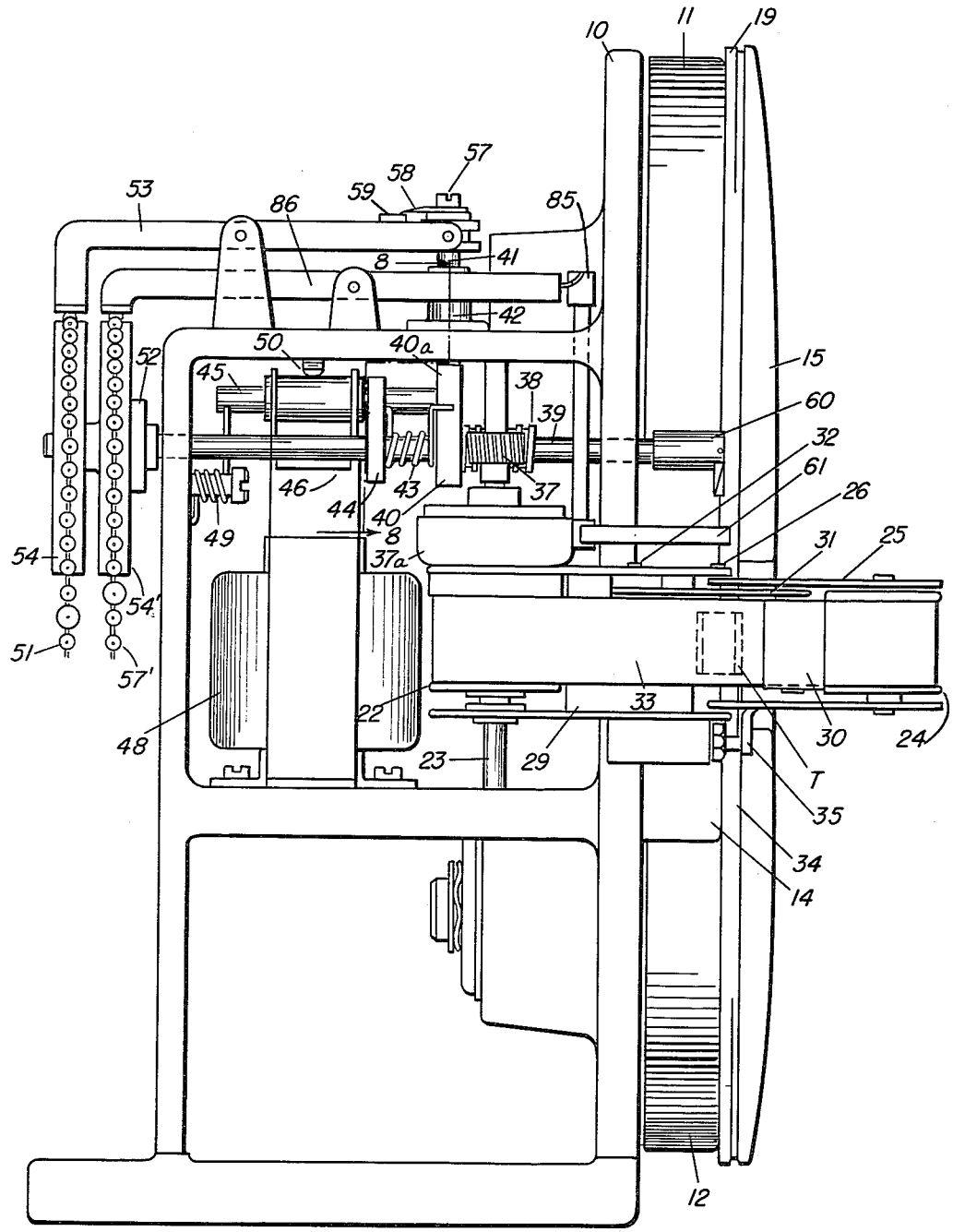
FIGURE 2 is a view in side elevation of the apparatus of FIGURE 1.
Figure 3:
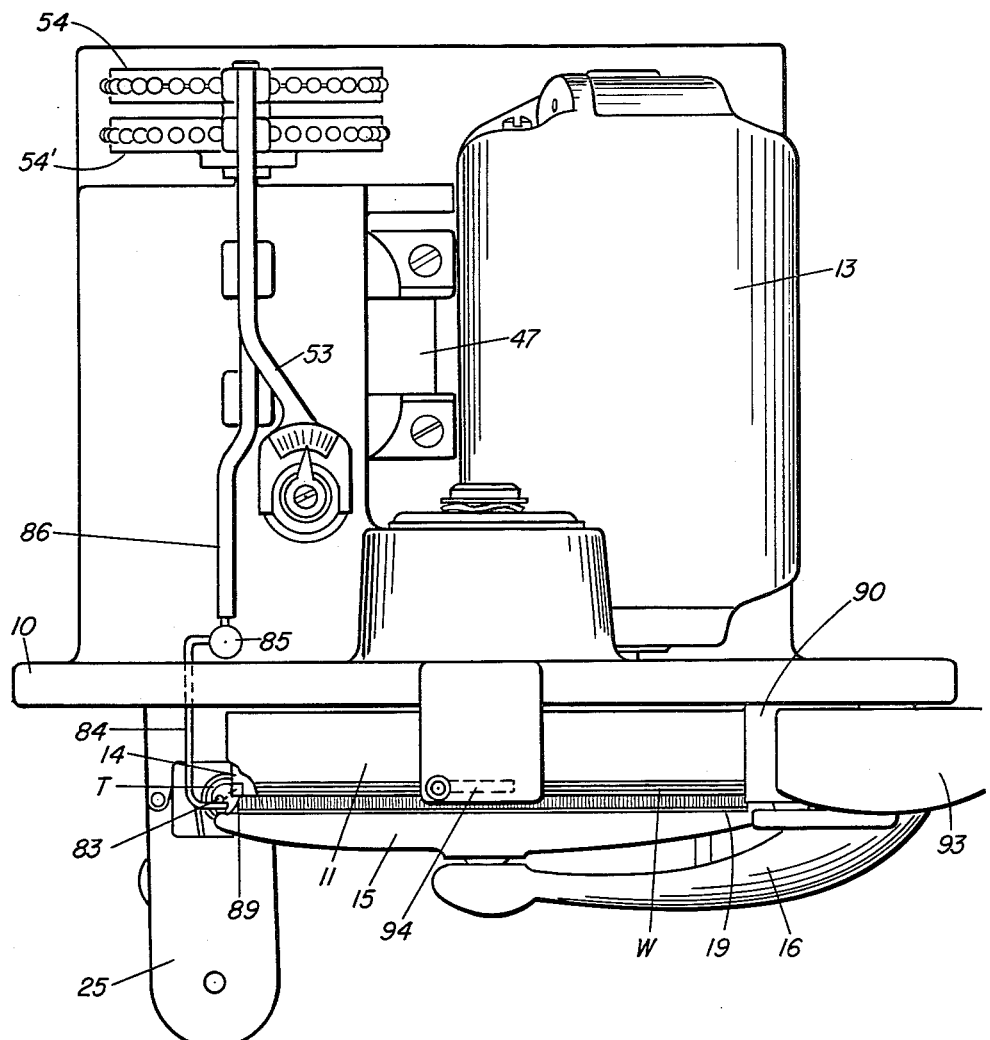
FIGURE 3 is a top view of the apparatus of FIGURE 1.

Referring first to FIGURES 1–3, the invention is illustrated as embodied in an apparatus particularly adapted for winding closed or toroidal forms, although it will be understood that the principles embodied therein can be applied to various shapes of cores or forms. The apparatus includes a support frame, indicated generally by the numeral 10, in which are journalled for rotation about generally parallel, spaced-apart axes a pair of drums 11 and 12 constituting the primary supports or guides for the moving wire loop system. In operation, the two drums are rotated in the same direction (clockwise as viewed in FIGURE 1) by a driving motor 13 through suitable friction drive or gear connections (not shown) to one of the drums, the other drum being driven through the wire loop system to be described. The faces of the drums are disposed in a common vertical plane, and the space in this plane between the drums is bridged by a fixed filler plate 14 forming part of the wire loop system control.

Figures 4, 5:
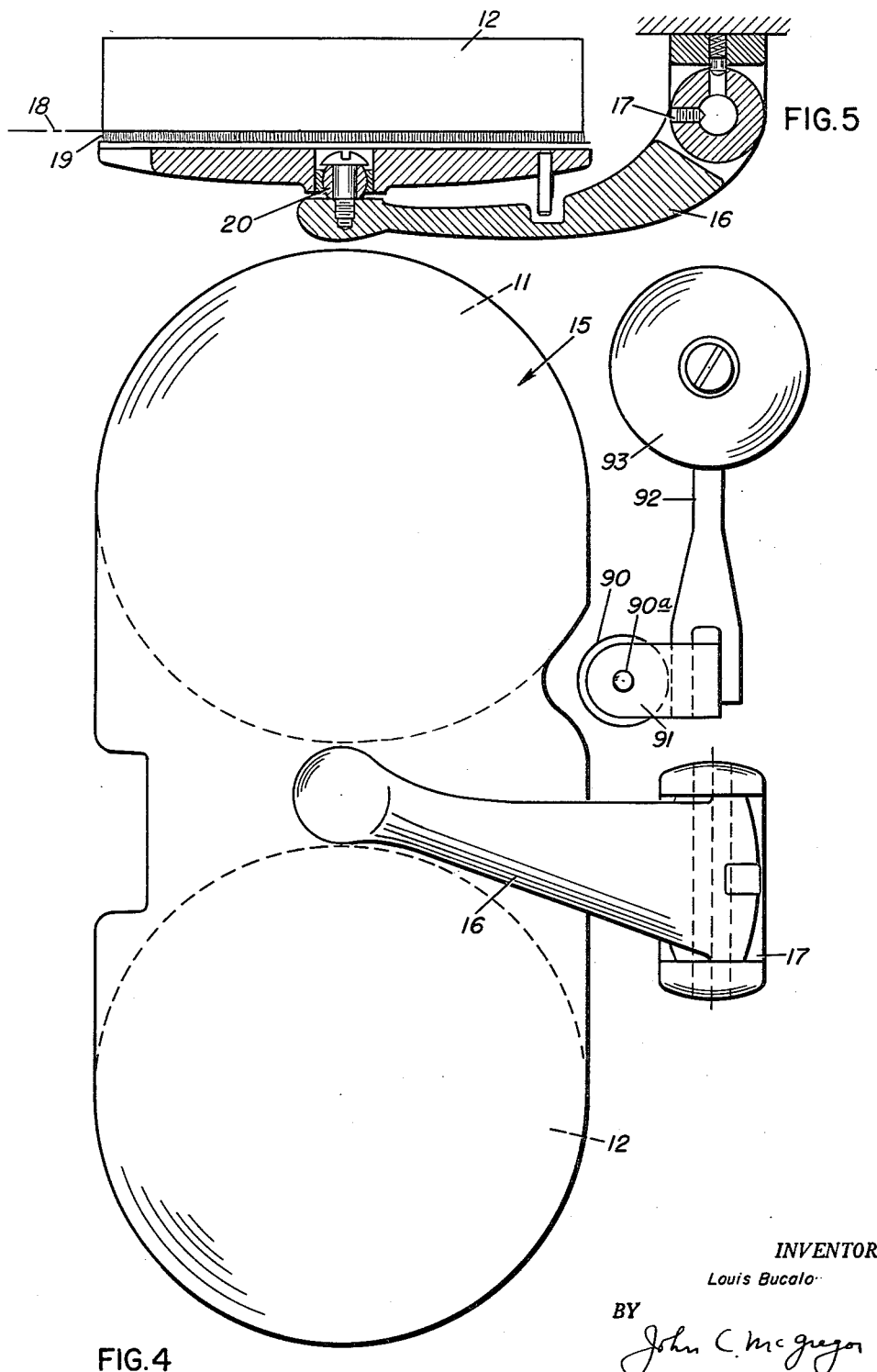
FIGURE 4 is a front view of the cover plate assembly which is affixed to the apparatus of FIGURES 1–3.
FIGURE 5 is a view in horizontal section of the cover plate assembly of FIGURE 4, and including in phantom lines the opposing surfaces of a portion of the apparatus.

Tension control means for the loop system taking the form of a cover plate assembly, indicated generally by the numeral 15 (FIGURES 4 and 5), is hinged by a support bracket 16 and hinge unit 17 to the frame of the apparatus to be swung between an operative position in which the inner surface 18 of the cover plate assembly closely abuts the coplanar faces of the drums 11 and 12 and the filler plate 14. Preferably, the inner face 18 carries friction means such as fingers 19 which can take the form, for example, of flexible bristles normally pressed into engagement with the rotating and fixed surfaces to control free loops of wire of the loop system, all as described below. In order that the face 18 might readily seek a position in which contact between the friction means and the faces of the filler plate 14 and the drums 11 and 12 is uniform throughout, the cover plate is joined to the bracket arm 16 through a ball joint connection 20. Preferably, spring means are incorporated in the hinge 17 to establish the desired contact pressure.

The form T to be wound with a wire coil by the apparatus is adapted to be carried by a support assembly 21, best seen in FIGURES 2 and 7, including a driven pulley 22 rotatable about a clutch shaft 23 journalled in the frame 10 for rotation about a vertical axis. Spaced from the pulley 22 is a freely rotatable pulley 24 carried in a swinging support 25 hinged to the frame at 26. Between the pulleys 22 and 24 are a pair of guide bushings 27 and 28, a spacer block 29, and a tension or idler roller 30 journalled at the free end of a swinging arm 31 hinged to the support assembly at 32. An endless belt 33 passes about the pulley 22 and is looped between the guide bushings 27 and 28 to wrap around the major portion of the circumference of the toroidal form T. The belt 33 continues around the pulley 24 and back to the driven pulley 22, with the latter limb being engaged by the idler or tension pulley 30 under the influence of a predetermined spring force, thereby to take up slack in the belt, as would appear when small diameter toroidal forms T are used. A secondary adjustment of the belt tension is effected through an adjustable stop 34 working against a depending lug 35 on the support assembly 25. In this fashion, the toroidal form T is supported for rotation on a vertical axis leaving full access through its center opening and to one section 36 of its circumference.

The support assembly 21 is such, in accordance with the invention, that regardless of the diameter of the toroidal form mounted therein, the degree of circumferential displacement of the toroidal form is at all times in exact conformance with the motion of the belt 33. In other words, a large diameter toroidal form will partake of the same circumferential displacement as will a small toroidal form for any given travel of the belt 33. However, the angular displacements of forms of different size will vary inversely with the diameter.

The driven pulley 22, it will be recalled, rotates about the clutch shaft 23 journalled in the frame 10. The shaft 23 is driven by a worm gear 37 through uni-directional driving means which can take the form of a one-way clutch 37a to which is affixed the driven pulley 22. The worm gear is driven by a worm 38 which is freely rotatable on a shaft 39. As best seen in FIGURE 8, the worm 38 has affixed thereto a radius arm 40, also freely rotatable with respect to its supporting shaft 39. The tip or free end 40a of the radius arm is adapted to swing downwardly in a counterclockwise direction, as viewed in FIGURE 8, against an adjustable stop member 41 mounted in a stationary bushing 42 both for rotary movement about its own vertical axis and for vertical axial movement. The lower end of the stop member 41 includes a series of steps 41a and 41b which take the form of cylindrical rings, all of which are preferably concentric with respect to each other and slightly eccentric with respect to the axis of the stop member 41.

When the stop member 41 is in its lowermost position, as indicated in FIGURE 8, the tip 40a of the radius arm 40 will abut against the upper and larger step 41b. When the stop member 41 is raised slightly, the tip 40a will be able to swing downwardly in a counterclockwise direction against the smaller step 41a. Because the stop rings 41a and 41b are eccentric with respect to the axis of the member 41, it will be understood that the arrested position of the radius arm 40 can be varied to an extremely fine degree by rotating the stop member 41 about its axis. The latter degree of motion can be carried out manually or automatically for purposes of attaining a fine adjustment in the operation of the apparatus. The vertical or axial movement is properly carried out automatically as part of a programmed cycle of operation of the apparatus, as will be described later.

The radius arm 40 is coupled by a U-shaped torsion spring 43 to a yoke member 44, which is affixed to the shaft 39 for turning movement therewith. The arms of the yoke 44 embrace a crosspiece 45 secured to the upper end of an armature 46 of a solenoid assembly 47 including a winding 48. The armature 46 is normally biased upwardly out of the winding 48 by spring means 49, with a stop pin 50 being provided to determine the upper limit of travel. When the winding 48 is energized, the armature 46 is drawn downwardly, pulling with it the yoke 44 which rotates the shaft 39. The radius arm 40, which is free of the shaft 39, is swung downwardly by the torsion spring coupling 43 until its tip 40a engages one of the stop rings 41a or 41b, whichever is in position, of the stop member 41.

The vertical adjustment of the stop member 41 is controlled by linkage means illustrated in FIGURE 2 and including a rocker arm 53 which rides on a signalling chain 51 supported and driven by a programming wheel 54. The programming wheel 54 is driven by a stepping mechanism 52 attached to the shaft 39. Rotation of the programming wheel 54 is such that a different element of signalling chain 51 is available for each wire turn on the form T. The signalling chain 51 is normally set up before a winding operation begins to modify the motion or travel of the belt 33 of the movable support 21 for the toroidal forms T. With the stop member 41 in a fixed position, it will be seen that each time the radius arm 40 is driven through an arc by means of the solenoid assembly 47 working through the yoke 44 and the torsion spring coupling 43, the worm 38, which turns with the radius arm 40, will drive the worm gear 37 to rotate the shaft 23 through the uni-directional driving means 37a, this in turn driving the drum 22 to move the belt 33 to turn the toroidal form T on its axis. By shifting the stop member 41 upwardly, the degree of motion imparted to the radius arm 40 is increased because the tip 40a is able to swing downwardly to the lower stop ring 41a. The result is a larger incremental travel for the belt 33, and hence, a larger turning motion for the form T. By suitably designing the stop rings, motion of the toroidal form can be made to range upwardly from zero degrees of rotation to a maximum value in which no part of the stop member 41 intercepts the radius arm 40.

The programming action of the apparatus can derive from means such, for example, as the endless bead chain 51 passing over the wheel 54. By setting up the bead chain 51 with bead elements of different size, the lever 53 will partake of corresponding degrees of motion, thereby to selectively interpose either the stop ring 41a or 41b or no stop ring in the path of travel of the tip 40a of the radius arm 40. As stated, for fine adjustment of the positions of the eccentric stop rings 41a and 41b relative to the tip 40a of the radius arm 40, the stop member 41 is rotatable on its axis, thereby to present different positions of the stop rings. If desired, this adjustment can be effected manually, as through a screwdriver slot 57, and the adjustment noted through a pointer 58 working in conjunction with a calibrated dial 59.

The apparatus also includes loop-releasing means 60 to flick loops of wire from the drum 11, tap-forming means, indicated generally by the numeral 61, to form taps at desired points in the winding on the toroidal form, and actuating means, indicated generally by the numeral 62 (FIGURE 9) to control the operation of the loop-releasing means 60 as well as other portions of the apparatus under the control of the solenoid 47.

Figure 10:
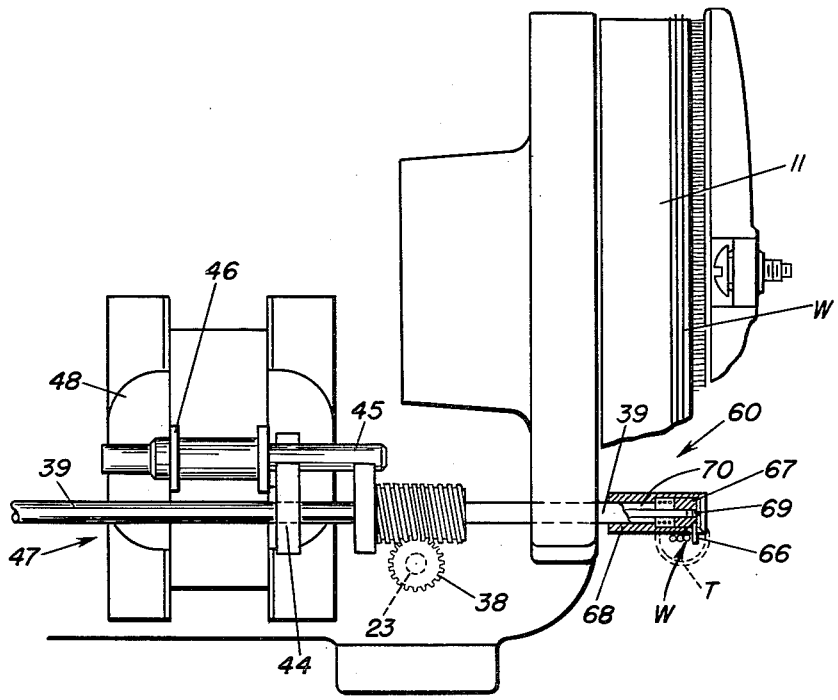
FIGURE 10 is a top view of a portion of the apparatus of FIGURES 1–3 showing details of the mechanism for casting loops from the drums.

Referring now to FIGURE 10, and assuming for the moment that a loop system of wire W has been put on the drums, the straight limbs of the wire loops (appearing in cross section in the figure) pass closely adjacent the loop-releasing means 60, the outermost limb engaging a stop pin 66 affixed to the outer end of the shaft 39. The pin 66 is adjustable axially of the shaft 39 by means including a slide block 67, movable axially in a sleeve 68 under the control of an adjusting screw 69 tapped into the end of the shaft 39 and working against a spring 70. Extending downwardly from the block 67, as best seen in FIGURES 1 and 2, is a knife-edged cam 71. When the shaft 39 rotates, the pin 66 swings upwardly to free the outermost loop of wire W, and at the same time the leading edge of the knife edged cam 71 swings upwardly behind that loop to flick it from the upper drum 11, the inclined surface of the cam 71 operating to shift the loop outwardly. In the illustrated apparatus, the shaft 39 rotates through an angle of approximately 82 degrees in bringing about the action just described. Once released from the drum 11, the loop of wire releases itself from the drum 12 automatically, as will be described below.

Figure 9:
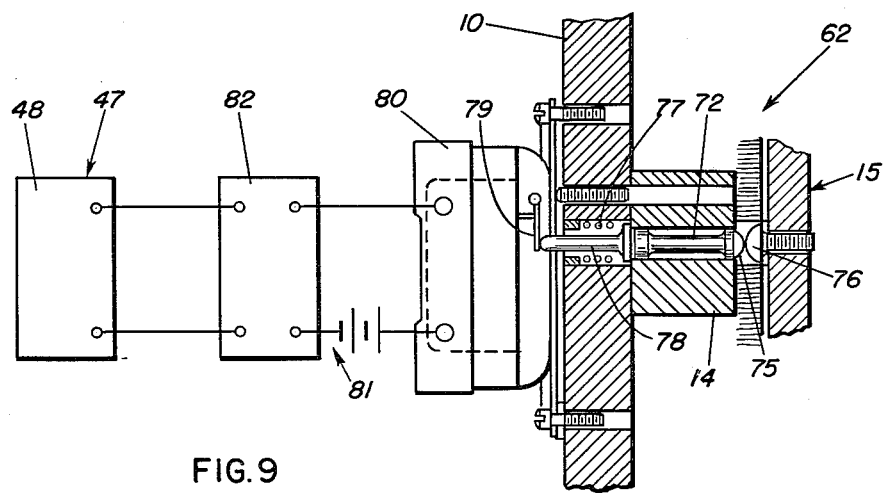
FIGURE 9 is a fragmentary view, partly diagrammatic in nature, of a portion of the control mechanism of the apparatus of FIGURES 1–3.

The actuating means 62 for initiating operation of the loop releasing means 60, among other parts of the apparatus, comprises, as best seen in FIGURE 9, a plunger 72 mounted in the filler piece 14 secured to the frame 10. The outer end 75 of the plunger 72 is rounded and normally projects, yieldably, for a short distance beyond the plane of the filler piece 14. The cover plate assembly 15, a portion of which is illustrated in FIGURE 9, includes a fixed abutment 76 which normally engages the rounded end 75 of the plunger 72. The plunger 72 is urged outwardly by spring means 77, and its inner end 78 is coupled to the actuating arm 79 of a relay 80 connected in a power circuit 81 including the winding 48 of the solenoid 47 and an adjustable time delay relay 82. In operation, as the loop of wire released from the drum 11 pulls tight around the toroidal form, as described below, the wire is pulled past the plunger 72 to actuate the relay 80 to energize the solenoid 47 to bring about the release of the next loop of wire from the drum 11.

It will be recalled that each time the solenoid 47 is energized to release the outermost loop of wire from the drum 11, the belt 33 of the support 21 for the toroidal form T is indexed forward by an amount depending upon the adjustment of the adjustable stop 41 working through the one-way clutch 37a to the driven drum 22. The apparatus can be set up therefore so that each successive turn put on the toroidal form falls next to the previous turn, with multiple layers being built up as the form goes into its second complete rotation. If it is desired to change the winding pattern on the form, i.e., to bunch a predetermined number of loops at one point on the form before rotating it, or to spread out the turns, such action can be effected through the programming wheel 54 by so arranging the program that the stop member 41 causes more or less rotation to be imparted to the belt drum 22.

In the event it is desired to form taps in the turns which are wound on the toroidal form at various points between the ends of the wire, the tap forming means 61 is actuated. This apparatus, as best seen in FIGURE 3, includes a holding pin 83 mounted on a supporting arm 84 secured in turn to a pivot shaft 85 journalled in the frame 10 for limited rotary movement. A rocker arm 86 pivoted on the main frame 10 is actuated by the signalling belt 51'.

In operation, a bulge appearing on the periphery of the programming wheel 54' will actuate the rocker arm 86 to rotate the pivot shaft 85 to swing the holding pin 83 into a notch 89 at the edge of the fixed plate 14. So positioned, the pin 83 is in a position to intercept a loop cast off of the drums and to hold the loop away from the toroidal form T by a measured distance. The shaft 85, being spring biased, returns to its outer or inactive position after a loop has been intercepted in order to allow the next cast-off loop to pass directly onto the toroidal form T. Eventually, after a number of turns have been put on the form behind the turn held slack by the pin 83, the form will have been rotated on its axis a sufficient distance to pull the slack turn free of the holding pin 83. In this fashion, loops of wire extend out of the wound toroid in the manner of pigtail leads and represent taps for the winding. After the toroidal form has been wound, it is released from the apparatus by cutting it free of whatever loops remain on the drums 11 and 12 and from the holding means 64, the severed ends representing the end terminals for the winding or coil.

A typical technique for setting up the apparatus for operation involves, as a first step, inserting the form T in the support assembly 21. This is accomplished by swinging the entire support assembly 21 outwardly about the shaft 23 for approximately 90° in a clockwise direction as viewed in FIGURE 7. The swinging support 25 is moved still farther in the same direction, pivoting about the shaft 26 to increase the distance between the guide bushings 27 and 28 so that a form to be wound can be readily mounted in the assembly. Once the form T is mounted in the assembly 21 and the assembly is shifted to its active position, the wire W is strung on the winding apparatus by drawing an end of the wire from the supply spool 63 and threading it upwardly past wire holding or anchoring means 64, now inactive, through the center of the toroidal form T which has been mounted in the support 21. Wire is then wrapped around the top of the drum 11 and the bottom of the drum 12 to complete one loop about the drums. The leading end of the wire W can now be secured to the adjacent vertical limb of the loop as by soldering or cementing, for example, using the fixture 65 to form a joint C which is preferably kept as small as possible for reasons presently to be described. The motor 13 can now be energized to drive the drums in a clockwise direction, as viewed in FIGURE 1, to draw from the supply spool 63 onto the drum loops containing sufficient wire for winding the toroidal form T. This wire will appear on the drums 11 and 12 as loops disposed one after the other from the outer edge of the drums inwardly, as best seen in FIGURE 10. As each successive loop is drawn onto the drums, one limb will pass through the center of the toroidal form T. Normally, only a few loops, say 2½, 3, or 4, are required on the drums to furnish a supply of wire for completely winding the toroidal form, in which case only three or four limbs of wire will be passing through the center of the form at any given time. The trailing end of the wire W leading from the supply spool 63 upwardly through the toroidal form is then fixed as by securing it to the holding means 64, for example. As an alternative technique for building the loop system on the drums, an expendable or a detachable lead belt or string can be strung through the form and about the drums. The leading end of the wire to be wound on the form is attached to the belt, and the drums are driven to pull loops of wire onto the drums to form the loop system, thus obviating the need to secure the leading end of the wire to the next adjacent limb. After the coil has been wound on the form, the endless belt can either be severed or separated as might be necessary to remove it from the form.

The tensioning and positioning of the loops of wire on the drums can be controlled by the wire steering, and slack take-up roller 90, adjustably supported by articulated carrier arms 91 and 92, the latter being spring biased inwardly by spring means (not shown) in a support assembly 93. By appropriate adjustment of the angle of the axis 90a of the roller 90, the loop of wire on the drums 11 and 12 can be steered into closely packed relationship adjacent the outer edges of the drums, the desired amount of tension being imparted to the wires at the same time.

Figure 11:
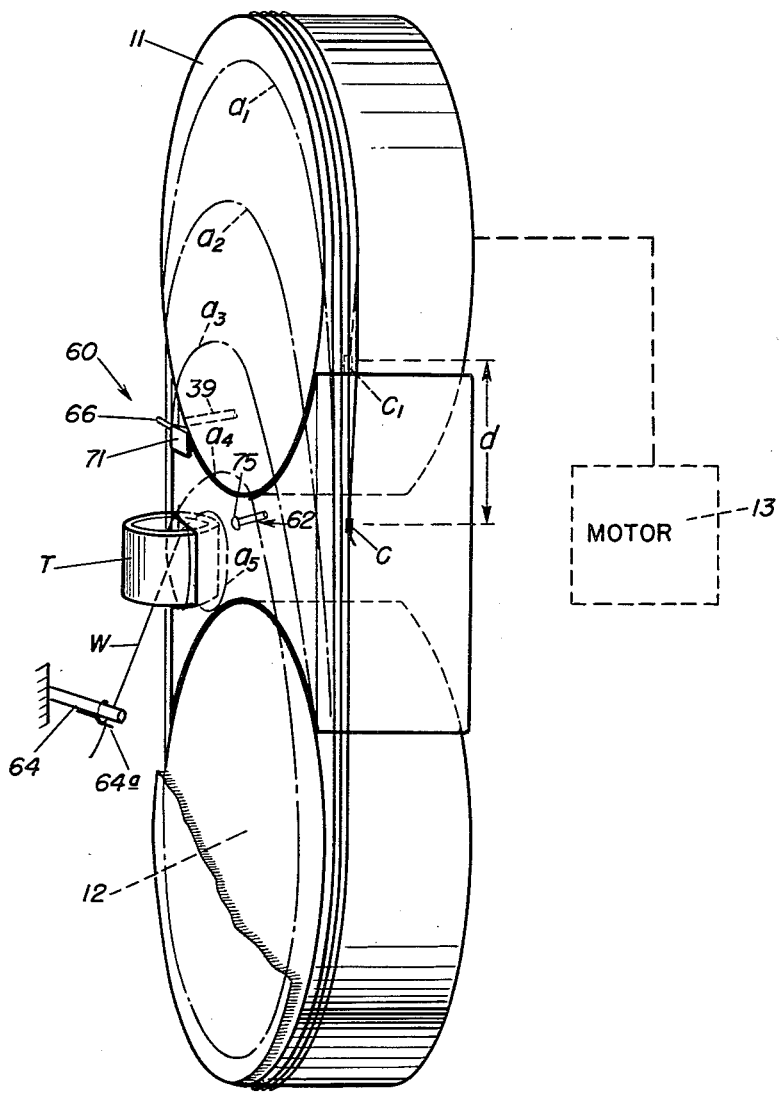
FIGURE 11 is a diagrammatic view showing in operation certain basic elements of the apparatus.

Referring to FIGURE 11, the final stage of operation is begun by energizing in timed relationship, usually concurrently, both the motor 13 and the loop-releasing means 60. This can be done through a combination switch (not shown) or by suitable manual control of independent switches. The drums 11 and 12 begin to rotate in a clockwise direction, as viewed in FIGURE 1, and the loop-releasing means 60 immediately goes into operation by the combined action of the holding pin 66 swinging up and away from the adjacent limb of the first wire loop, and the knife-edged cam passing behind that limb of the loop to urge it outwardly and off of the drum 11. As the drums rotate, the cast-off loop is drawn down into the tension-controlling space between the cover plate assembly 15 and the face of the drum 11 where it encounters the frictional load imposed, for example by the bristles 19 on the inner face of the cover plate assembly, pressing against the drum faces and the filler plate 14 therebetween.

The tension in the cast-off loop which causes it to be drawn down through the frictional load derives from the holding means 64 to which one limb of the first cast-off loop is fixedly secured, and also from the frictional drive of the drums 11 and 12 on wire pulling against the secured limb. The frictional load serves throughout the period of drawing up the released loop to preserve the entire loop system. The continuing rotation of the drums 11 and 12 pulls the cast-off loop further and further downwardly as indicated diagrammatically in FIGURE 11 by the successive reference characters $a_1$, $a_2$, and $a_3$. As the cast-off loop is drawn more closely about the wall of the toroidal form T, the lower portion of the cast-off loop (see $a_4$) automatically slips off the lower drum 11 by virtue of its displacement between the two plates and is drawn upwardly through the frictional load space between the lower end of the cover plate assembly 15 and the face of the drum 12. When the slack in the cast-off loop is completely exhausted, there will be one winding or coil on the toroidal form T. However, just before the winding is pulled up tight on the toroidal form, the loop passes through the gap of the actuating means 62 to force the plunger pin 72 (FIGURE 9) inwardly to energize the solenoid 47 through the circuit including the relay 80, the time delay relay 82, if used, and the solenoid winding 48. As the first coil or winding is pulled up tight on the toroidal form, the holding pin 66 of the loop-releasing means 60 (FIGURE 1) swings upwardly together with the camming surface 71 to cast-off another loop which duplicates the take-up travel of the preceding loop until all of its slack is exhausted and it is drawn up tight on the toroidal form T.

Each time a winding or coil is put on the toroidal form T, the supply of wire in the loops on the drums is depleted by the amount of wire consumed. Thus, for example, if the joint C (the point at which the leading end of the wire was joined to the limb of the next adjacent loop) is regarded as a reference point, the point will be disposed in a position $c_1$ (indicated in broken lines) after the first winding has been put on the form. The point $c_1$ will be displaced from the point C by a distance $d$, representing the length of wire actually put on the toroidal form as a turn. With each successive turn on the form, the point C will be displaced by a distance equivalent to the wire consumed. At the time one complete loop of wire has been used up, a relatively large number of turns will have been put on the toroidal form. This action can continue until such time as there remains on the drums 11 and 12 one and a fraction loops of wire, which are expendable. Alternatively, the winding operation can continue until such time that there remains at the center of the wound form an extremely small hole which need be only slightly larger than two wire diameters, i.e., sufficient to pass the joint C. If it is desired to completely fill the toroidal form, the last two windings can be threaded by hand, using the expendable wire supply remaining in the form of loops on the drums.

It will be recalled that during the winding operation, as the drums spin at high speeds placing turn after turn on the form, the form is rotated by predetermined increments which are preset by means of the adjustable stop member 41 (FIGURES 2 and 8). It will also be recalled that the action of the stop member can be controlled during a winding operation to change or alter the pattern of build-up of turns on the form in almost any desired manner, that is to say, the incremental turning motion of the form can be partially arrested to build up turns only along a small arc of the form, as might be done, for example, in winding a toroidal transformer having two or more individual windings thereon. Also, it will be recalled that any given winding can be provided with any desired number of taps by actuating the tap-forming means 61 during the winding operation. As described, the location of the taps with respect to the turns of any given winding can be programmed automatically through the programming means 54'.

In certain cases, it is desired to wind a toroidal form not to a point completely filling the center, but a point achieving a desired electrical parameter, such, for example, as inductance. This is accomplished in accordance with the present invention by means of a contact brush 94 disposed adjacent a working surface of one of the drums, in this case the drum 11. It will be recalled that the point C can take the form of a soldered connection, rendering it electrically conductive as opposed to the remainder of the wire which is normally electrically insulated as by a coating of varnish. Each time the point C passes over the drum, beneath the contact brush 94, electrical contact is established with the brush contact. If desired, the drum can be made electrically conductive for a portion of its surface and electrically insulated from the frame of the unit, the contact brush or wiper 94 being operated directly on the conducting surface of the drum 11, which will be momentarily electrically coupled to the wire W as the connection C engages its surface. A second contact point can be established at the holding means 64 at the time the wire is clamped before completing the final stages of the winding operation. By baring the wire of insulation at this point, continuity can be established along the entire length of the wire. An electrical contact clip 64a can be provided for this purpose. A measuring instrument 95, connected by conductors 96 and 97 to the contacts 94 and 64a will afford readings indicative of the desired electrical parameter of the wound toroid. The indicating means 95 can include a dial 100a to be read by an operator or can be connected by conductors 99 to a relay 100 including normally closed contacts 101 in the circuit 102 to energize the electrical motor 13, thereby to shut down the apparatus automatically when the toroid has attained the desired electrical characteristics.

While the invention has been illustrated and described above having reference to a specific embodiment thereof, it will be understood that it can take other forms and arrangements within the scope of the present invention. Thus, for example, the contact points between which measurements are taken to indicate completion of the winding operation need not necessarily include the junction C, but can utilize a portion of the electrically conducting wire bared of insulation, and the pick-off contact can be disposed in any one of a number of locations. Also, forms or cores of various sizes and shapes other than the toroidal form of the illustrated embodiment can be wound.

Tension-controlling means for the loop system can also take other forms. Loop system control can be imparted by adhesively joining adjacent loops of wire of the loop system as by the use of a lacquer coating. After a loop is released, the remaining loops will retain their form, and the drawing-up action will be carried out. Another arrangement for effecting loop tension is shown in FIGURE 6 wherein spring biased disks 102 and 103 replace the friction-inducing bristles 19 of the cover plate of FIGURES 4 and 5. The disks 102 and 103 include circular ribs 105 and 106 respectively which engage the faces of the drums 11' and 12' close to their edges under pressures controlled by springs 107. Bristles 19' or similar friction means engage filler piece 14'. The bristles 19' and tensioning disks 102 and 103 find support in a common mounting plate 110, hingedly mounted to the frame in the manner of the arrangement of FIGURES 4 and 5. As each loop is released from the drums, it is pulled along the face of the drums against the frictional forces imparted by the ribs 105 and 106 and the bristles 19' so that at no time is the slack wire out of control.

The releasing of the loops from the drums in the arrangement of FIGURE 6 is automatic in that releasing means 60 in the form of a cast-off member or cam and the adjusting means 62 are not required. The drum edges are formed with chamfers defining notches 111 and 112 between the drum edges and the disks 102 and 103. The spring pressure on the disks holds the loop system in position, pressing inwardly against the outermost loop, which is in the notches. When sufficient tension is built up in the loop system, the outer loop is automatically released. As stated, the feeding of the loops toward the drum edges can be accomplished by the piloting roller 90, or alternatively, it can be accomplished by canting the axes of the rollers or by forming tapered surfaces on the rollers. While the guide means which support the loop system has been illustrated as consisting of a pair of drums, it is not essential that exactly two drums be used. More drums can be interposed in the loop system to change the external shape thereof and, if desired, the loop system can be supported by a single drum, in which case it is preferred that the edge of the drum be yieldable radially inwardly to receive the form or core. To this end the drum edge comprises resilient fingers which are depressed radially inwardly at the core-mounting location. Wire wound about the drum in the loop system passes directly through the form while the resilient drum edge is pressed inwardly around the form.

Various other arrangements and embodiments of the invention will suggest themselves to those skilled in the art. The invention should not, therefore, be regarded as limited except as defined by the following claims.

I claim:

1. Apparatus for winding turns of wire on a form comprising means to support the form to be wound with turns of wire, guide means to support a system of a plurality of loops of wire of substantially larger size than the turns to be put on the form and to hold limbs of the loops in position to pass exposed through the supported form, motive means to drive the loop system in rotary motion, loop-releasing means to release successive loops of wire from the guide means, said loop-releasing means including a movable member complementary to said guide means and having a first portion to position the outermost loop of said loop system to be released from the guide means to be drawn closed on the form, said movable member including a second member movable between the two outermost loops to drive the outermost loops from the guide means and to hold the next outermost loop on the guide means, the motion of the driven loop system taking up the slack of each released loop to pull a turn about the form, and tension means including complementary friction surfaces in the space between the periphery of the loop system and the form, and spaced from the form, thereby to engage the released loop to maintain tension throughout the loop system during the intervals of taking up the slack of the released loop.

2. Apparatus as set forth in claim 1, said loop-releasing means including actuating means for the movable member, said actuating means being interposed in the path of travel of the successive loops as they are drawn up into turns on the form.

3. Apparatus for winding turns of wire on a form comprising means to support the form to be wound with turns of wire, guide means to support a system of a plurality of loops of wire of substantially larger size than the turns to be put on the form and to hold limbs of the loops in position to pass exposed through the supported form, motive means to drive the loop system in rotary motion, loop-releasing means to release successive loops of wire from the guide means, the motion of the driven loop system taking up the slack of each released loop to pull a turn about the form, tension means including complementary friction surfaces in the space between the periphery of the loop system and the form, and spaced from the form, thereby to engage the released loop to maintain tension throughout the loop system during the intervals of taking up the slack of the released loop, and tap-forming means to form taps between the ends of the coils wound on the form, comprising, a movable member selectively interposable in the path of contracting loops, thereby to hold limbs of selected turns offset from the form.

4. Apparatus as set forth in claim 3, including control means to move the movable member between operative and inoperative positions.

5. Apparatus as set forth in claim 3, including tap-forming means including a holding member selectively interposable in the path of travel of the cast-off loops being drawn up as turns on the form, thereby to hold limbs of wire offset from the form to provide taps for the wound coil, said programming means including means to actuate the holding member.

6. Apparatus for winding turns of wire on a form comprising means to support the form to be wound with turns of wire, guide means to support a system of a plurality of loops of wire of substantially larger size than the turns to be put on the form and to hold limbs of the loops in position to pass exposed through the supported form, motive means to drive the loop system in rotary motion, loop-releasing means to release successive loops of wire from the guide means, the motion of the driven loop system taking up the slack of each released loop to pull a turn about the form, tension means including complementary friction surfaces in the space between the periphery of the loop system and the form and spaced from the form, thereby to engage the released loop to maintain tension throughout the loop system during the intervals of taking up the slack of the released loop, said guide means comprising a pair of laterally spaced-apart drums rotatable on generally parallel axes and about which the loops are wound, said motive means to drive the loops being connected to rotate at least one of said drums, and filler plate means between said drums having a face substantially coplanar with the faces of the drums.

7. Apparatus as set forth in claim 6, said tension means for controlling the released loops comprising friction means yieldably engaging the faces of the drums and of the filler plate to control the loops cast off the drums.

8. Apparatus as set forth in claim 7, including means to urge the loop system toward the edges of the drums.

9. Apparatus as set forth in claim 6, including programming means responsive to the drawing up of successive turns of wire on the form to rotate the form.

References Cited in the file of this patent

UNITED STATES PATENTS

| | | |
|---|---|---|
| 302,417 | Mather | July 22, 1884 |
| 751,816 | Strong | Feb. 9, 1904 |
| 2,070,252 | Borner | Feb. 9, 1937 |
| 2,305,651 | Vienneau | Dec. 22, 1942 |
| 2,627,379 | Moore | Feb. 3, 1953 |
| 2,666,591 | McCain | Jan. 19, 1954 |
| 2,697,559 | Scarce et al. | Dec. 21, 1954 |
| 2,812,136 | Stern-Montagny | Nov. 5, 1957 |
| 2,863,609 | Link | Dec. 9, 1958 |
| 2,868,466 | Hammer | Jan. 13, 1959 |

FOREIGN PATENTS

| | | |
|---|---|---|
| 382,384 | Germany | Dec. 2, 1921 |
| 679,117 | France | Jan. 5, 1930 |
| 328,944 | Great Britain | May 5, 1930 |
| 639,177 | Great Britain | June 21, 1950 |
| 523,338 | Great Britain | July 11, 1940 |